United States Patent Office 3,364,036
Patented Jan. 16, 1968

3,364,036
DISPERSING HYDROPHILIC COLLOIDS
George E. Tesko, Montvale, N.J., and Robert J. Soukup, New City, N.Y., assignors to General Foods Corporation, White Plains, N.Y., a corporation of Delaware
No Drawing. Filed Nov. 7, 1963, Ser. No. 322,020
9 Claims. (Cl. 99—139)

This invention relates in general to hydrophilic colloids that are soluble in water at moderate temperatures. More particularly, it concerns the dispersing of such colloids in water so that the colloids will dissolve in the water by reason of their inherent solubility.

Hydrophilic colloids, such as gelatin, are essentially soluble in water at moderate temperatures, say 80° F. However, if quantities of such a colloid are attempted to be solubilized in water at this temperature, it will be found that the colloid does not readily go into solution. Thus, with gelatin desserts that are made by dissolving a powdered material in water and then lowering the temperature of the solution to one at which a gel state is achieved, it has been found necessary to increase the temperature of the water in which the gelatin dessert mixture is to be dissolved to one substantially greater than the minimum temperature at which gelatin is soluble. This increased temperature at solution results in a longer period of refrigeration required for the dessert to gel. It will be apparent that if water must be added at say 180° F. in order to dissolve a mixture from which a gelatin dessert is to be formed, it will take a considerably longer period of time for the gelatin to gel after the solution has been placed in the refrigerator than if solution had been achieved at 80° F. The inordinately lengthy period of time necessary to prepare gelatin desserts has resulted in their lack of use where preparation of a meal is commenced just prior to consumption. In order to provide a gelatin dessert for dinner, the housewife must usually begin preparation of the dessert well prior to the preparation of the other ingredients of the meal.

The problem of the length of time necessary to cause gelation of a dessert solution has not been found to be due to inherent insolubility of the gelatin ingredient. Where the other ingredients, e.g., sugar, flavor, color and food acid, are all immediately soluble in water at room temperature, the gelatin is also soluble at the same temperature. Gelatin which has been dried from the sol state intrinsically has the ability to dissolve in water at about 60° F. to 80° F.; this ability is dissipated, however, because the gelatin tends to float on the surface of the water in lieu of being dispersed throughout it. As hydration proceeds at the surface of the liquid, the particles of colloid stick together, clump and gel, so that even if they do sink into the liquid, they will have lost most of their ability to be soluble in it. Consequently, it is necessary that the colloidal particles be dispersed in the solvent before they form clumps and gel, rendering their solution impossible at low temperatures.

The problem of dispersing the ingredients of a dry gelatin dessert mix in water has been recognized by those skilled in the art. Thus, in U.S. Patent No. 2,819,970 to Steigmann, it was suggested that the gelatin be coated with a dispersant. The dispersants named were silicones, esters of polyhydric alcohols and fatty acids, such as glycerol monostearate, fatty acid esters of sorbitan, polyoxyethylene derivatives of esters of sorbitan, polyoxyethylene derivatives of sorbitan esters, and polyoxyethylene derivatives of fatty acids. Other dispersants suggested were fatty acid amides, sulfated monoglycerides of fatty acids, sulfated partial esters of fatty acids and polyhydric alcohols, sulfuric acid esters of hydroxy carboxylic acids esterified with higher fatty alcohols, cationic wetting agents, metal salts of substituted quaternary hydroxy-cycloimidinic metal alcoholates, and other high molecular weight materials.

The dispersing agents suggested in U.S. Patent No. 2,819,970 have been found to have one or more of the following shortcomings:

(1) Solutions in which they are used acquire a cloudy character, although clarity is a generally desired condition;
(2) Off flavors and odors from the dispersant or from oxidation and breakdown of the dispersant in storage are present; and
(3) Undesirable physical reactions, such as coacervation and precipitation, take place between the dispersant and the gelatin or other colloid.

In addition, many high molecular weight organic compounds have not appeared to be suitable for use as dispersants, because they generally have low solubility in water at room temperature. They may also prove to be solutes for the hydrophilic colloid to be dispersed by them.

The present invention is founded on the discovery that four low molecular weight, aliphatic acid esters of polyhydric alcohols are good dispersants for gelatin and other hydrophilic colloids in an aqueous medium so that, upon dispersion, the essentially soluble colloids will dissolve in water. These dispersants are diacetin (glyceryl diacetate), triacetin (glyceryl triacetate), dipropionin (glyceryl dipropionate), and tripropionin (glyceryl tripropionate). These di- and tri-substituted esters of glycerol have extremely low volatility, slight flavor and aroma, excellent water solubility at room temperature, negligible or no solubilization of hydrophilic polymers, and very high densities that aid in sinking particles of the colloidal polymer into the solvent. Butyric acid esters of glycerol have not proved suitable for use, since slight hydrolysis produces obnoxious off-odors. Compounds such as propylene glycol and glycerin are not useful, since they tend to dissolve the hydrophilic colloid.

The composition of the present invention is, in its basic form, a hydrophilic colloid coated with a dispersant which is either diacetin, triacetin, dipropionin or tripropionin. Of these dispersants, triacetin has been found to be the most effective with the least amount of off-odor and off-taste when used with many different hydrophilic colloids. The preferred use for these compositions is, as mentioned above, in gelatin-type desserts. The dispersant causes the essentially water soluble colloid to sink into the solvent and to dissolve therein by virtue of its inherent solubility.

A wide range of hydrophilic colloids may be dispersed in an aqueous medium by the four dispersants listed therein. Such hydrophilic colloidal polymers include gelatin, sodium caseinate, methyl cellulose derivatives such as sodium carboxymethylcellulose, and the like. Also included with the term, hydrophilic colloids, are farinaceous materials, such as wheat flour, corn fluor, and potato flour. So far as commercial applications are concerned, the preferred colloid to be coated with dispersant is gelatin, since this colloid is in wide use for forming gelatin desserts, which can now be made in a substantially lesser period of time without producing a cloudy gel having off-flavors and odors. In order to achieve a gelatin dessert that is soluble in water at temperatures of less than 80° F., it has been found preferable to use amorphous gelatin, i.e., gelatin that has been dried from the sol state. Such drying from the sol state can be accomplished by means of drum drying or spray drying, as distinguished from slab drying. In the latter technique, a gelatin solution is first gelled, dried, then cut into pieces and ground to a powder. The gelatin should have a relatively low moisture content, preferably less than 4 percent by weight. While every hydrophilic colloid has not been tested, there is no reason why all hydrophilic colloids will not be dispersed by the four dispersing agents which, when coated on a hydrophilic colloid, form the basic of the present invention.

The dispersant, which may be any of the four dispersing agents stated herein or combinations thereof, should be coated on the colloidal particles so as to prevent those particles from temporarily bonding to one another when placed in contact with water. At the same time, the dispersants increase the weight of the particles and help to sink the particles below the surface of the water. Still further, the wetting power of the dispersants acts to distribute the particles throughout the water. Wetting and sinking of the particles of colloid are important functions of the dispersants, since a major problem in solubilizing powdered colloids is floatation of the polymer at the surface of the liquid. While hydration of a surface mass of concentrated particles of polymer results in temporarily or permanently gelled masses that are either extremely difficult or impossible to disperse, the colloidal particles coated with dispersant are wetted and distributed by the dispersant and, aided by gentle mixing, are solubilized in the water by virtue of the intrinsic solubility of the colloid. The dispersant does not increase the solubility of the colloid, but because of its wetting and sinking power, places particles of the colloid out of contact with other such particles and thereby enables the individual particles to dissolve freely in the water. The dispersant accomplishes this function without causing objectionable, long-lasting foams that tends to trap undissolved polymer particles. These foams can be created if significant agitation is applied to the colloidal particles in the water.

As has been stated, the dispersing agents of the present invention are coated on the particles of hydrophilic colloid. Coating can be accomplished in several ways that will be apparent to those skilled in this art. For example, the colloid and the dispersant can be placed in a mortar and the dispersant smeared on the colloid by means of a pestle. The dispersant, a liquid, can be sprayed directly on the colloid. An alcoholic solution of the dispersant can be sprayed on the hydrophilic colloid and the alcohol permitted to evaporate. Also, the dispersant can be dissolved in alcohol, ground with the colloid in a mortar and pestle, and the alcohol again allowed to evaporate. In each case the resultant product will be particles of hydrophilic colloid coated with a dispersant selected from the group consisting of diacetin, triacetin, dipropionin and tripropionin.

Preferred procedures for producing a dispersant-coated hydrophilic colloid in accordance with the present invention are as follows.

*Example I*

Gelatin was drum dried from the sol state, and to 20 grams of the gelatin was added a solution of 0.5 cc. of triacetin in 10 cc. of ethyl alcohol. The mixture was ground in a mortar and pestle and subsequently air dried to remove the alcohol. The amount of triacetin was determined to be 2.5% of the weight of the gelatin (dry basis). With gentle stirring, the coated gelatin dissolved completely in water of 80° F. in 3 minutes.

*Example II*

The test of Example I was repeated, except that 20 grams of wheat flour (100 mesh) was substituted for the gelatin and tripropionin substituted for the triacetin. The coated flour produced dispersed in water at 80° F. with gentle stirring.

The concentration of the dispersant with respect to the weight of the gelatin or other hydrophilic colloid used is not critical. It will, of course, be obvious that an effective amount of dispersant must be used. With respect to the particular dispersants named herein, concentrations of 1 to 15% based on the weight of colloid (dry basis), have been found to be preferred, with 5 to 10% of the dispersant being most preferred. When too little dispersant is used, the dispersibility will be incomplete; where too much of the dispersant is used, the product will not be dry and flowable and, if it is utilized in a gelatin dessert, for example, there may be foul-ups in the apparatus that automatically measures the proper amount of the gelatin dessert mixture in a carton, since the mixture will tend not to fall into the package. To determine the precise concentration of triacetin, for example, that should be used to coat a particular gelatin dried from a sol state, would require a simple series of trial and error experiments, since the amount of triacetin is dependent, in part, on the particle size, density and moisture content of the colloid to be coated. Thus, for every particular dispersant used in connection with every particular hydrophilic colloid, a small amount of experimentation will be necessary to determine optimum quantities.

Where gelatin is the preferred hydrophilic colloid, the use of the gelatin coated with dispersant in a mixture containing a sweetening agent, an edible acid, a buffer salt, flavor and color, will be highly desirable. The sweetening agent may be sugar, saccharin or other sweetening material. The edible acid may be one or more of those normally used in gelatin desserts, such as adipic acid, citric acid or fumaric acid. The buffer salt would be exemplified by sodium citrate. The color and flavor would be those commercially available.

A typical formulation of a gelatin dessert mixture according to the present invention is:

*Example III*

| | Grams |
|---|---|
| Drum-dried gelatin coated with 2.5% triacetin | 10 |
| Sugar | 72 |
| Adipic acid | 2.4 |
| Sodium citrate | .7 |
| Color and flavor | .1 |

The above formulation was soluble in water at 80° F. after three minutes of gentle stirring. The solution was clear with no cloudiness apparent, and upon refrigeration gelled in the manner of a conventional gelatin dessert formulation.

It will be apparent that certain alterations, substitutions and modifications in the disclosure of our invention and in the specific examples set forth will be obvious to those skilled in this art. All such obvious changes are desired to be included within the scope of the present invention, which is to be limited only by the purview of the following appended claims.

What is claimed is:

1. A dry, water-soluble, composition of matter, comprising particles of gelatin and a dispersant coated on said patricles, said dispersant being selected from the group consisting of diacetin, triacetin, dipropionin and tripropionin, said dispersant being present in about 1 to 15% by weight of said gelatin and effective to forestall clumping and gelling of said particles of gelatin during hydration thereof.

2. The composition of matter claimed in claim 1, in which said dispersant constitutes 5 to 10% by weight of said gelatin.

3. A dry, water-soluble composition of matter, comprising particles of amorphous gelatin coated with triacetin, said triacetin being present in an amount of about 1 to 15% by weight of said gelatin.

4. A dry, water-soluble dessert composition, comprising particles of amorphous gelatin coated with triacetin said triacetin being present in an amount of about 1 to 15% by weight of said gelatin, a sweeting agent, and an edible acid.

5. A dry, water-soluble dessert composition comprising particles of gelatin coated with a dispersant selected from the group consisting of diacetin, triacetin, dipropionin and tripropionin, said dispersant being present in an amount of about 1 to 15% by weight of said gelatin; a sweetening agent; an edible acid; and a buffer salt.

6. The composition of matter claimed in claim 1, in which said gelatin is amorphous gelatin.

7. The dry, water-soluble dessert composition claimed in claim 5, in which said gelatin is amorphous gelatin.

8. A process of dispersing a hydrophilic colloid selected from the group consisting of gelatin, gum arabic, sodium caseinate and sodium carboxymethylcellulose, in water which comprises coating particles of said colloid with a dispersant selected from the group consisting of diacetin, triacetin, dipropionin and tripropionin, said dispersant being present in an amount of about 1 to 15% by weight of said colloid, and then dispersing said coated colloid particles in water.

9. A process of dispersing an edible flour in water which comprises coating particles of said flour with a dispersant selected from the group consisting of diacetin, triacetin, dipropionin and tripropionin, said dispersant being present in an amount of about 1 to 15% by weight of said flour and then dispersing said coated flour particles in water.

References Cited

UNITED STATES PATENTS

| | | | |
|---|---|---|---|
| 2,376,656 | 5/1945 | Buchanan | 106—208 X |
| 2,445,226 | 7/1948 | Landers | 252—363.5 |
| 2,692,201 | 10/1954 | Conrad et al. | 99—130 |
| 2,819,970 | 1/1958 | Steigmann | 99—130 |
| 2,919,992 | 1/1960 | Gorman et al. | 99—113 X |
| 2,933,397 | 4/1960 | Maturi et al. | 99—113 |
| 3,074,807 | 1/1963 | McGowan et al. | 99—134 X |
| 3,173,807 | 3/1965 | Marotta et al. | 127—71 X |

OTHER REFERENCES

Whistler et al., "Industrial Gums," 1959, Academic Press: New York, page 110.

"Kelco Algin," 1961, Kelco Company, Clark, N.J. 13 pages, page 2 only relied on.

A. LOUIS MONACELL, *Primary Examiner.*

JOSEPH M. GOLIAN, *Examiner.*

J. M. HUNTER, *Assistant Examiner.*